Patented May 14, 1940

UNITED STATES PATENT OFFICE 2,201,064

PHOSPHATIDE COMPOSITION

Benjamin H. Thurman, Bronxville, N. Y., assignor to Refining, Inc., Reno, Nev., a corporation of Nevada No Drawing. Application August 5, 1939, Serial No. 288,685

10 Claims. (Cl. 99—15)

This invention relates to phosphatide compositions, and more particularly to compositions in which phosphatides are employed as modifying agents.

Vegetable phosphatidic materials may be recovered from various seeds in which they occur in association with vegetable oils. Various procedures, such as extraction with phosphatide solvents, may be employed to remove the phosphatides from the seeds. A portion of the phosphatides is usually removed from the seeds along with the oil when the seeds are processed either with solvents or pressed to produce oil. Crude vegetable oils, therefore, comprise an excellent source of vegetable phosphatides which may be recovered from the oils by precipitation with water, electrolytes in aqueous solution, alcohol, etc. The precipitated phosphatides are preferably continuously centrifugally separated from the oil but may be otherwise separated. The separated phosphatides are in crude form and contain many other materials such as residual glyceride oils, resins, carbohydrates, proteins and other gummy materials. It is many times desirable to separate a portion of the oil with the phosphatides to act as a carrier. After being dried in vacuo to prevent fermentation and to render them oil soluble, they may be employed in the crude form for many purposes in accordance with the present invention but may be purified as hereinafter described if found necessary or desirable.

If the vegetable oil contained in the seeds contains linolenic acid radicals or other acid radicals of the same or higher unsaturation, the phosphatides also contain such fatty acid radicals. The present invention is concerned with vegetable phosphatides which contain no fatty acid radicals of higher unsaturation than linoleic acid, i. e., recovered from seed which contain oil having no fatty acid radicals of greater unsaturation than linoleic acid or from the crude oil obtained from such seeds. Examples of such phosphatides are corn phosphatides and cottonseed phosphatides. These vegetable phosphatidic materials are stable against oxidation, contain no fish cr paint like odor or flavor and do not develop such odors or flavors on standing or exposure to the atmosphere. They are stable under relatively high temperatures, for example temperatures upward to 400° F.

In contrast, soya bean lecithin, which was the only vegetable lecithin known to commerce prior to the present development, contains linolenic acid radicals, is readily oxidizable and is heat sensitive. It not only darkens and oxidizes under elevated temperature but also decomposes by splitting off of nitrogenous compounds. It also has a fish or paint like odor which persists or returns even after extensive purification. The vegetable phosphatides of the present invention are also distinguished from animal lecithins in that the present vegetable phosphatides are predominantly of the cephalin type whereas animal lecithins are predominantly of the lecithin type.

The dried crude vegetable phosphatides may be partially purified by treating with a solvent for the phosphatides, for example, hydrocarbon solvents such as hexane, petroleum ether, benzol, etc., to dissolve the phosphatides. The mixture may then be separated by centrifugal separation, decantation, or filtration. The insoluble residue contains meal, inorganic salts, proteins, resins, carbohydrates, etc., and is discarded. By evaporating off residual solvent, a partially purified phosphatidic material still containing any oil present as a carrier is obtained. If it is desired to obtain substantially purified phosphatides, the phosphatides may be precipitated from the separated solvent solution above described by adding acetone thereto and separating the precipitated phosphatides from the solution by decantation, filtration, or centrifugal separation. After being washed repeatedly with acetone and the residual acetone evaporated, substantially pure vegetable phosphatides are obtained. By way of example, purified corn phosphatides contain approximately from 1.2 to 1.5% nitrogen, from 2.9 to 3.5% phosphorus, and have an iodine number varying from 40 to 80. A specific example of a purified corn phosphatide contained 1.3% nitrogen, 3.0% phosphorus and had an iodine number of 75. A specific example of a purified cottonseed phosphatide contained 1.2% nitrogen, 2.8% phosphorus, and had an iodine number of 70. The purified corn phosphatide was a grayish white paste and the cottonseed phosphatide was a yellow powder. Both phosphatides were free of linolenic acid, and were extremely stable and completely soluble in glyceride oils.

In accordance with the present invention, vegetable phosphatides of the type above described are employed in food products generally because of their stability and lack of disagreeable odor and taste. They are self-stabilized, and also stabilize the food products both against oxidation and any tendency to revert to the flavor of any highly unsaturated fats and oils contained in the food product. Greater amounts of the phosphatides of the present invention can be added to food products than is the case of similar soya bean lecithin without imparting deleterious properties thereto. In general, they give improved results over soya bean or animal lecithins. For example, where the phosphatides are employed for their emulsifying properties advantage can be taken of the possibility of adding larger amounts in order to produce an improved emulsion.

In addition to the general properties above discussed which are imparted to food products containing phosphatides of the present invention, addition of from $\frac{1}{10}$ to 5% of such phosphatides to shortenings increases their creaming power, water retention power and enable higher ratios of sugar to flour to be used in cakes without causing falling or the production of "sad" cakes. The shortenings to which the phosphatides are added may contain animal or vegetable oils or fats. For example, they may be lard, other animal fats or hydrogenated vegetable oils, etc. The addition of the phosphatides to the shortening also prevents staleness and produces a finer texture of the cake. For enabling a higher sugar ratio to be employed or for preventing staleness, it is not necessary that the phosphatides be introduced into the cake through the shortening. That is to say, the phosphatides may be added in combination with the sugar, flour, baking power, etc. In icings, the phosphatides act as softeners and water retention agents and also allow increased amounts of sugar to be employed while maintaining a smooth product.

The phosphatides of the present invention also produce improved results in yeast-raised baked products in that they increase the activity of the yeast so as to give an increased yield and also increase the tenderness of the product to produce a light, even and more tender texture. They make the gluten more dilatable, which may be one explanation of the light and even texture.

The phosphatides furthermore impart improved characteristics to margarine or butter irrespective of their employment as shortenings in cakes or other pastries. In margarine the combination with phosphatides reduces spattering, increases the water retention without leaking and prevents milk solids from sticking to the utensil during frying. It is particularly effective with margarine containing coconut oil or in coconut oil itself to prevent sticking of such food products as eggs to the utensil during frying. The phosphatides furthermore stabilize butter against oxidation and impart an improved color to both butter and margarine, particularly if the more highly colored phosphatides such as cottonseed phosphatides are employed. When a small amount of the phosphatides is incorporated into oils or fats prepared from or containing oils having fatty acid radicals with more than two double bonds, such as soya bean oil, which normally revert to an original or paint or fish odor and flavor prior to rancidity, this reversion is prevented not only in the oil or fat but in food products prepared therefrom. The presence of phosphatides in winterized oil also retards crystallization of solid fats in addition to stabilizing the same.

When employed with chocolate, the phosphatides increase the fluidity and prevent graying and blooming. These phosphatides, particularly the corn oil phosphatides, increase the covering power of the chocolate composition and furthermore stabilize the carrier for the chocolate which is usually a fat. They are markedly more efficient than any of the lecithins of the prior art and a smaller quantity is required. They also impart desirable qualities to candy, as they retain any fat present evenly distributed throughout the candy and fix volatile flavoring agents therein. They similarly fix volatile flavoring agents in chewing gum and furthermore prevent brittling thereof so that the product remains fresh on the dealer's shelf. Also, the amount of sugar which can be incorporated into the chewing gum is increased. When incorporated in flavoring materials, i. e., flavoring extracts such as lemon, orange and other essential oils or extracts, or such extracts as vanilla extract, they prevent oxidation of the flavoring material and also retain the volatile flavoring extracts in the products in which they are employed.

Incorporation of phosphatides into sandwich spreads provides a smoother spreading product and constitutes an excellent emulsifier to stabilize such spreads against separation of oils and fatty materials. For example, in peanut butter the phosphatides prevent separation of the oil and make the same smoother. When incorporated in mayonnaise they prevent separation of the oil and fat emulsion and perform a similar function in soup and sauces such as ketchup, and act as a protective colloid or emulsifying agent to produce a smooth and non-separating product.

They are particularly desirable for incorporation into food products which readily oxidize, for example, potato chips, wherein they prevent rancidity of the fat. They may also be incorporated into solid seasoning materials for the prevention of rancidity, for example, spices, pimento, etc.

The incorporation of a small amount of the phosphatidic material in milk retards separation of cream and also enables other agents such as chocolate to be more readily dispersed therein. By first combining the phosphatides with the chocolate as a product of manufacture, this material can be made more readily dispersable in the milk. Furthermore, the phosphatidic material may be added to skim milk to increase its nutritive value. It may also be incorporated in cream as a preservative and to increase its whipping characteristics. Various other milk products are improved by the presence of the phosphatidic material. For example, it prevents crumbling in cheese and increases the water retention properties of the cheese as well as stabilizing the same against rancidity. In ice cream or sherbets the phosphatidic material acts as an emulsifying agent or protective colloid to make a smoother product, and also prevents crystallization of lactose to the same end. The phosphatidic content of the ice cream may be incorporated therein by first incorporating the same in the milk or cream or other ingredients employed for making ice cream. By adding the phosphatidic material to milk prior to drying, a spray-dried milk product containing the phosphatidic material intimately incorporated therein is produced, which product can be more readily dispersed in water or other liquid and also the dried product has increased keeping qualities.

When incorporated in edible gelatine for desserts, etc., the phosphatidic material produces a more tender product, retains the flavor and retards drying. Puddings of the corn-starch and chocolate type are improved in characteristics as to stability, smoothness and flavor retention by the incorporation therein of the phosphatides of the present invention.

The phosphatides of the present invention also impart desirable properties to many pharmaceutical preparations such as tonics, vitamin preparations, etc. They increase the nutritive value of the pharmaceutical preparations and preserve emulsions such as, for example, codliver or other oil emulsions, and also stabilize vitamin compositions against oxidation and loss of vitamin content. They also preserve highly refined fish or fish liver oils from reverting to their original odor and flavor.

When the phosphatidic material of the present invention, particularly the alcohol soluble portion thereof, is incorporated in alcoholic beverages, it improves the flavor of the beverage and retains the bouquet.

Many compositions employed for other than edible purposes are also improved by the incorporation of the phosphatidic material of the present invention. For example, incorporation of the phosphatidic materials into fat liquor for leather treatment adds leather softening properties to the liquor. The phosphatides also increase the softening properties of leather dressings for application to leather.

The present phosphatides have improved emulsifying properties and are desirably included in such materials as paints, either casein paints or oil paints, particularly lithopone paints, in which the phosphatides promote suspension of the pigment and increase the distribution thereof in the liquid. They furthermore act as anti-skinning and anti-livering agents in varnishes or paints and also as stabilizers or protective colloids in lacquers such as nitrocellulose lacquers.

They provide excellent emulsifying properties in asphalt and tar emulsions or in impregnating agents such as creosote for wood.

By employing the phosphatides in such materials as insecticides, for example, suspensions of copper compounds or other metal compounds or liquids such as kerosene, etc., not only is the suspension of the compound improved but adhesion to plants is promoted.

Rubber compositions are also improved by the presence of the phosphatides. For example, the phosphatides act as accelerators during vulcanizing, facilitate mixing of rubber compositions and act as softeners in the resulting composition. They are also effective as softeners in various other plastic compositions and act as homogenizing agents for resin compositions. Such products as linoleum are improved by the presence of the phosphatidic materials as softening agents. The phosphatides are desirably employed in the formation of blown oils for linoleum or other purposes since they act as anti-splitting agents and prevent loss of the oil. They act as emulsifying or dispersing agents in various other compositions, for example, as protective colloids employed in small amounts in electroplating oxide to give a more uniform film. They also act as dispersing agents in photographing emulsions. They stabilize lubricating greases, providing better lubricating film formation so as to increase the lubricating properties thereof. They are desirably incorporated in lubricating oils, particularly light lubricating oils as an antioxidant and lubrication promoting agent. Lubricating oils containing phosphatides are particularly useful for textiles to lubricate the fibers. The phosphatides act as softening agents for the textiles and also prevent oxidation of the oil employed for softening.

The phosphatides also act as a control in dye baths for textiles, in that they retard oxidation of the leuco form of the dye.

The phosphatides also increase the emulsifying powers of soaps and other detergents and act as a skin softener in toilet soaps. They furthermore act as skin softening agents in cold cream preparations or brushless shaving creams or various other ointments. When incorporated into tooth paste they act as emulsifying and softening agents to improve the texture and detergent properties thereof.

A small amount of the phosphatides incorporated into tobacco cause both moisture and flavor to be retained therein by acting as flavor retaining anti-dessicants. Thus, cigarettes, cigars, pipe tobacco and other forms of tobacco are improved and stabilized against loss of moisture and deterioration.

Mixtures of the phosphatides and sulfonated oils form improved emulsifying agents for various purposes.

The phosphatides also function as antioxidants and gum inhibitors in gasoline. They also stabilize tetraethyl lead to prevent the same from clouding and deteriorating both before and after addition to gasoline.

In ore flotation processes the phosphatides, particularly barium and calcium salts, provide preferential adsorption for the various minerals, thus improving the separation thereof.

Unexpected results are obtained from the mixture of small quantities of lecithin, for example, ½ of 1% to 3%, with putty. It has been found that this materially increases the plasticity of the clay and results in hardening without cracking.

I claim:

1. In combination, a food product, and a vegetable phosphatidic material incorporated therein, said vegetable phosphatidic material being free of fatty acid radicals of higher unsaturation than linoleic acid and which has been isolated from crude vegetable oils free from fatty acid radicals having more than two double bonds and being concentrated and substantially free of deleterious ingredients and being stable against oxidation and against the production of an unpalatable flavor and odor.

2. In combination, a food product, and a vegetable phosphatidic material incorporated therein, said vegetable phosphatidic material being free of fatty acid radicals of higher unsaturation than linoleic acid and which has been isolated from crude vegetable oils free from fatty acid radicals having more than two double bonds and being concentrated and substantially free of deleterious ingredients and being stable against oxidation, darkening, and the production of deleterious odors and flavors under cooking temperatures.

3. In combination, a food product, and a vegetable phosphatidic material incorporated therein, said vegetable phosphatidic material being free of fatty acid radicals of higher unsaturation than linoleic acid and which has been isolated from crude vegetable oils free from fatty acid radicals having more than two double bonds and being concentrated and substantially free of deleterious ingredients, said food product having said phosphatidic material incorporated therein having improved water retention properties and being free of deleterious odor or flavor normally associated with vegetable phosphatidic material.

4. In combination with a food product containing fatty material and water, a small amount of vegetable phosphatidic material free from fatty acid radicals of greater unsaturation than linoleic acid and which has been isolated from crude vegetable oils free from fatty acid radicals having more than two double bonds and being concentrated and substantially free of deleterious ingredients dispersed therein to retain the water admixed with said fatty materials, said phosphatidic materials being free of deleterious odors and flavors whereby a substantial quantity may be employed in said product.

5. In combination with a milk product containing fatty material and water, a small amount of vegetable phosphatidic material free from fatty acid radicals of greater unsaturation than linoleic acid and which has been isolated from crude vegetable oils free from fatty acid radicals having more than two double bonds and being concentrated and substantially free of deleterious ingredients dispersed therein to retain the water admixed with said fatty materials, said phosphatidic materials being free of deleterious odors and flavors whereby a substantial quantity may be employed in said product.

6. In combination with edible chocolate compositions, a small amount of vegetable phosphatidic material free from fatty acid radicals of greater unsaturation than linoleic acid and which has been isolated from crude vegetable oils free from fatty acid radicals having more than two double bonds and being concentrated and substantially free of deleterious ingredients incorporated therein to retard graying and blooming and to increase the covering power without imparting a deleterious odor or taste thereto.

7. In combination, a food product comprising cheese in which is incorporated a small amount of vegetable phosphatidic material free of fatty acid radicals of higher unsaturation than linoleic acid and which has been isolated from crude vegetable oils free from fatty acid radicals having more than two double bonds and being concentrated and substantially free of deleterious ingredients.

8. In combination with a dessert food product, a small amount of vegetable phosphatidic material free of fatty acid radicals of higher unsaturation than linoleic acid and which has been isolated from crude vegetable oils free from fatty acid radicals having more than two double bonds and being concentrated and substantially free of deleterious ingredients, to improve the texture of said food product.

9. A food product comprising a pudding in which is incorporated a small amount of vegetable phosphatidic material free of fatty acid radicals of higher unsaturation than linoleic acid and which has been isolated from crude vegetable oils free from fatty acid radicals having more than two double bonds and being concentrated and substantially free of deleterious ingredients, to improve the texture of said food product.

10. A food product comprising a cornstarch pudding in which is incorporated a small amount of vegetable phosphatidic material free of fatty acid radicals of higher unsaturation than linoleic acid and which has been isolated from crude vegetable oils free from fatty acid radicals having more than two double bonds and being concentrated and substantially free of deleterious ingredients, to improve the texture of said food product.

BENJAMIN H. THURMAN.